US009620985B2

(12) United States Patent
Rosenfeld

(10) Patent No.: US 9,620,985 B2
(45) Date of Patent: Apr. 11, 2017

(54) MULTI-COIL WIRELESS CHARGING

(71) Applicant: Intel Corporation, Santa Clara, CA (US)

(72) Inventor: Jonathan Rosenfeld, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 14/242,448

(22) Filed: Apr. 1, 2014

(65) Prior Publication Data

US 2015/0280482 A1  Oct. 1, 2015

(51) Int. Cl.
*H02J 7/00* (2006.01)
*H02J 7/02* (2016.01)
*H01F 41/04* (2006.01)
*H01F 38/14* (2006.01)

(52) U.S. Cl.
CPC .............. *H02J 7/025* (2013.01); *H01F 38/14* (2013.01); *H01F 41/041* (2013.01); *H02J 7/0042* (2013.01); *H02J 7/0052* (2013.01); Y10T 29/4902 (2015.01)

(58) Field of Classification Search
CPC ...... H01F 38/14; H01F 41/041; H02J 7/0042; H02J 7/0052; H02J 7/025; Y10T 29/4902
See application file for complete search history.

(56) References Cited

U.S. PATENT DOCUMENTS

| 5,973,495 | A | * | 10/1999 | Mansfield | .......... G01R 33/3628 324/318 |
| 2008/0298100 | A1 | * | 12/2008 | Esaka | ..................... H01F 38/14 363/67 |
| 2013/0043734 | A1 | | 2/2013 | Stone et al. | |
| 2015/0241999 | A1 | * | 8/2015 | Bae | ..................... G06F 3/03543 345/163 |

FOREIGN PATENT DOCUMENTS

| CN | 203491750 U | 3/2014 |
| JP | 2005110399 A | 4/2005 |
| JP | 2008301645 A | 12/2008 |
| JP | 2011072115 A | 4/2011 |
| JP | 2011216621 A | 10/2011 |
| JP | 2012044827 A | 3/2012 |
| JP | 2014132808 A | 7/2014 |
| TW | 201230585 A | 7/2012 |
| TW | M435696 U1 | 8/2012 |

OTHER PUBLICATIONS

Taiwan IPO Search Report, TW Application No. 104105652, completion date Jan. 25, 2016, 2 pages.

* cited by examiner

*Primary Examiner* — Vuthe Siek
(74) *Attorney, Agent, or Firm* — International IP Law Group, P.L.L.C.

(57) ABSTRACT

Techniques of forming a wireless power receiving unit are described herein. The techniques may include forming a first receiving coil of a device to be charged by inductive coupling to a first transmitting coil. The techniques may include forming a second receiving coil of a device to be (Continued)

charged by inductive coupling to a second transmitting coil. The second receiving coil is disposed at an angle to a plane of the first receiving coil, and the first receiving coil and the second receiving coil are formed to connected in parallel to a receiving circuit.

24 Claims, 9 Drawing Sheets

300

300

400

MULTI-COIL WIRELESS CHARGING

TECHNICAL FIELD

This disclosure relates generally to techniques for wireless charging. Specifically, this disclosure relates to a wireless power receiving unit having a first and second receiving coil.

BACKGROUND ART

Magnetic resonance wireless charging employs a magnetic coupling between a transmit (Tx) coil and a receive (Rx) coil. When current flows through a conductor, such as a Tx coil, magnetic field is created. When a second conductor, such as a Rx is disposed within a proximity of the magnetic field, current is generated and flows within the second conductor.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for providing a wireless power receiving unit having multiple receiving coils. A first receiving coil and a second receiving coil may be coupled in parallel, rather than simultaneously, to a receiving circuit. The second receiving coil may be disposed at an angle to the first receiving coil. In the aspects described herein, the first and second receiving coil may be configured to receive charge from multiple wireless power transmitting units.

For example, a device such as a smartphone, having a first receiving coil disposed on a bottom portion of the cellular phone. A second receiving coil, connected in parallel to the first receiving coil at receiving circuitry, may be disposed on a side portion of the cellular phone. As discussed in more detail below, the first receiving coil may be magnetically coupled in a vertical direction when placed on a device having a wireless charging transmitting unit, such as a wireless charging pad. In some aspects, the second receiving coil may magnetically coupled in a horizontal direction from a device, such as a laptop computer, having a wireless power transmitting coil configured to couple with the second receiving coil at the side of a mobile device, such as a cellular phone. In the techniques described herein, magnetic coupling in a horizontal direction as well as a vertical direction may provide alternative charging options for a device containing a first and second wireless charging receiving coil.

Figure 1:
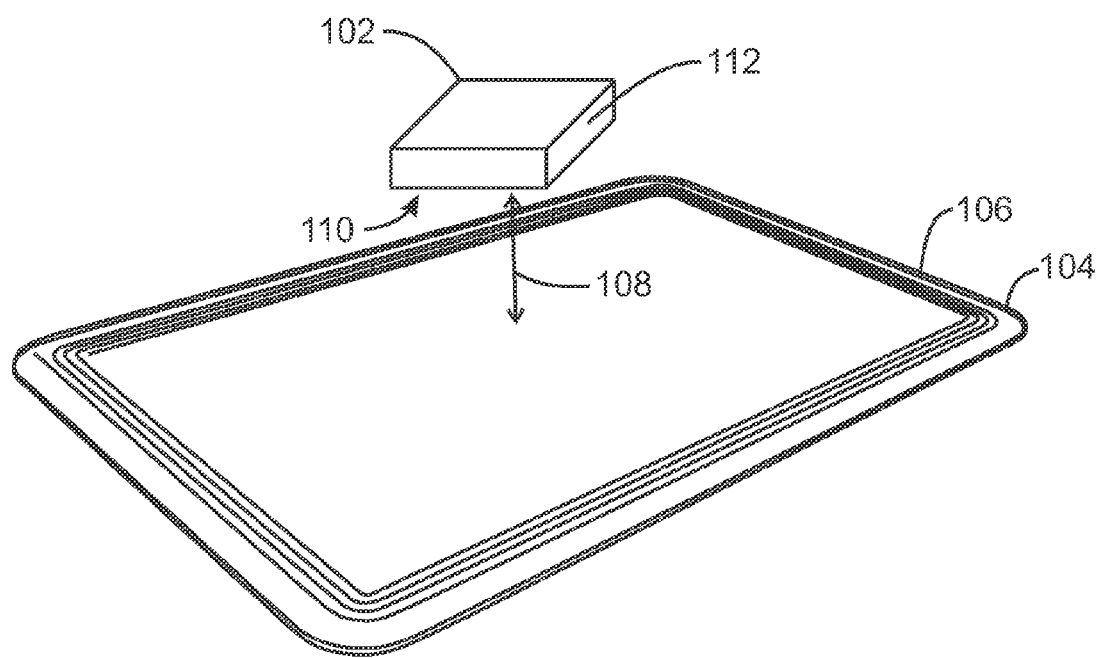
FIG. 1 is diagram illustrating a device to be charged by a transmitting coil.

FIG. 1 is diagram illustrating a device to be charged by a transmitting coil. The device 102 may be configured to receive a charge from a charging device 104 having a transmitting coil 106, as indicated by the arrow 108. The device 102 may have a receiving coil (not shown) at disposed near the bottom of the device 102 as indicated by the arrow 110. The device 102 may also include a receiving coil (not shown) disposed at a side of the device 102 as indicated by the arrow 112.

The device 102 may be a computing device including any computing device such as a desktop computer, laptop computer, tablet computing device, a cellular/mobile phone such as a smartphone, having multiple receiver coils to be wirelessly charged thereby. The charging device 104 may be a wireless charging pad. As discussed in more detail below, the multiple receiver coils in the device 102 may enable the device to receive charge from the charging device 104, as well as other charging devices placed adjacent to the device 102, such as a laptop having a wireless transmitting coil disposed at a side of the laptop.

Figure 2A:
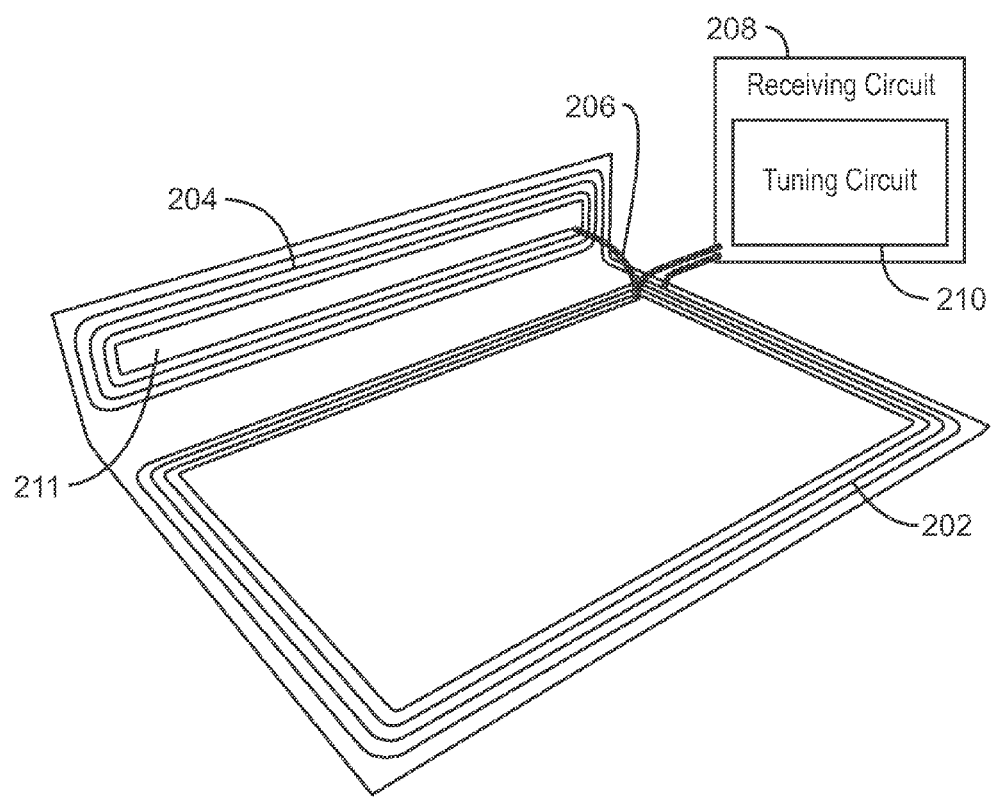
FIG. 2A is an example illustration of a wireless power receiving unit that may be used in a device to be charged.

FIG. 2A is an example illustration of a wireless power receiving unit that may be used in a device to be charged. The wireless power receiving unit 200 includes a first receiving coil 202, and a second receiving coil 204. The first receiving coil 202 and the second receiving coil 204 may be coupled as indicated at 206. Both receiving coils 202 and 204 are connected to a receiving circuit 208.

As illustrated in FIG. 2A, the second receiving coil 204 may be disposed at an angle to a plane of the first receiving coil 202. In some aspects, the angle may be a perpendicular angle of ninety degrees. As discussed in more detail below in reference to FIG. 3, the angle need not be perpendicular but may include other angles.

In some aspects, the parallel connection 206 of the first receiving coil 202 and the second receiving coil 204 may reduce the resistance of the wireless power receiving unit 200. In some aspects, the parallel connection 206 enables the first receiving coil 202 and the second receiving coil 204 to be coupled to a single tuning circuit 210. Specifically, the parallel connection 206 presents a single effective inductance to the receiving circuit 208, and to tuning capacitors (not shown) of the tuning circuit 210 such that the single tuning circuit 210 may be used rather than an independent circuit for each of the first receiving coil 202 and the second receiving coil 204.

As illustrated in FIG. 2A, the first receiving coil 202 and the second receiving coil 204 have turns. In embodiments, the number of turns of the second receiving coil may be based on a ratio indicated in Equation 1 below:

$$\frac{A_{Rx2}}{A_{Rx1}} = \frac{N_{Rx2}}{N_{Rx1}} \qquad \text{Eq. 1}$$

In Eq. 1, $A_{Rx2}$ and $A_{Rx1}$ are the areas associated with the second receiving coil 204 and the first receiving coil 202, respectively. The variables, $N_{Rx2}$ and $N_{Rx1}$ are the coil turns of the second receiving coil 204 and the first receiving coil 202, respectively. Generally, maximization of magnetic flux coupling depends, in part, on the maximization of an opening 211 of a coil, such as the second receiving coil 204. In some aspects, the number of turns in the second receiving coil 204 may be determined by the ratio of Eq. 1, enabling a maximum amount of turns to increase coil inductance while maximizing the opening 211. Assuming the area of the first receiving coil 202 is larger than the area of the second receiving coil 204, the second receiving coil 202 may have less turns than the first receiving coil 204.

In some aspects, instead of using the area to determine the ratio of the turns, a linear measure can be applied e.g. using the dimension of the coils in one direction, in particular in vertical dimension of a vertical coil, such as the second receiving coil 204, and correspondingly, a horizontal dimension of a horizontal coil, such as the first receiving coil 202. Assuming the common dimension is identical; the area relation is determined by these mentioned relations. This can be called a diameter of the respective coil. However the diameter may also be measured via other linear dimensions, e.g., diagonal across the coil or at an angle.

Figure 2B:
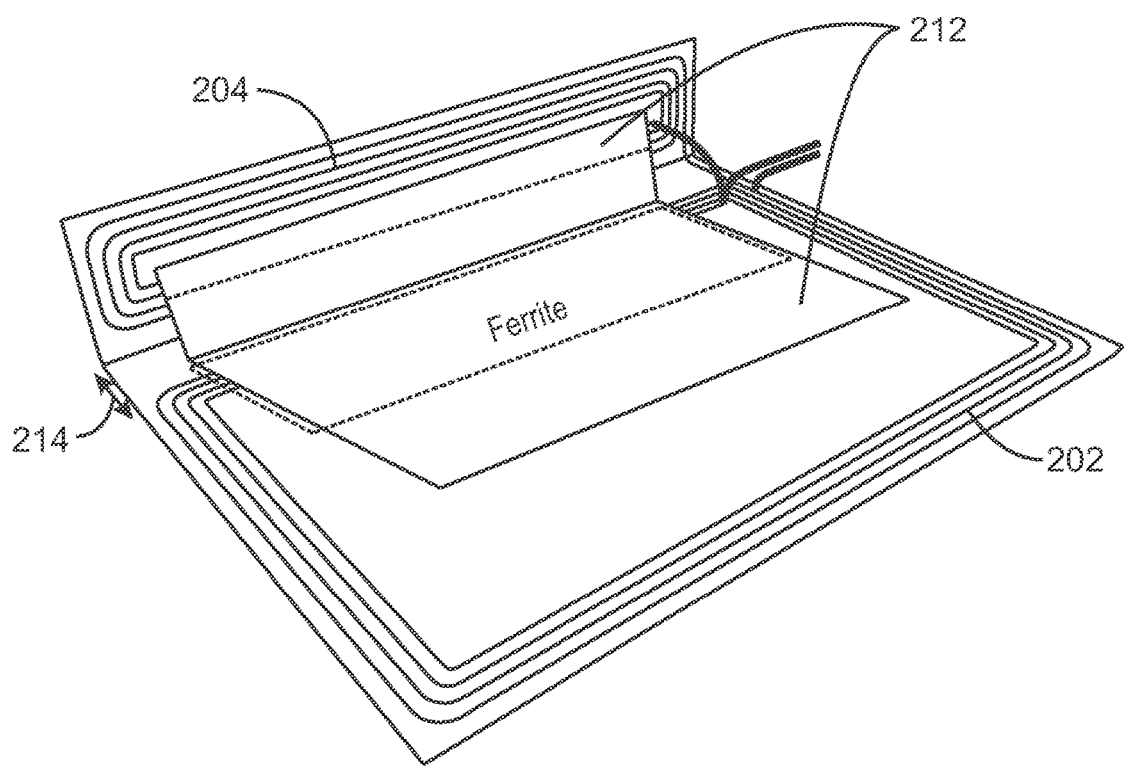
FIG. 2B is an example illustration of a wireless power receiving unit having a magnetically conductive layer.

FIG. 2B is an example illustration of a wireless power receiving unit having a magnetically conductive layer. A magnetically conductive layer 212 may be a layer guiding magnetic flux or magnetic field lines. The magnetically conductive layer 212 may enhance inductive coupling of receiving coils, such as the first receiving coil 202 and the second receiving coil 204. Other example receiving coil configurations, such as the receiving coils discussed below in reference to FIG. 3A and FIG. 3B may likewise use a magnetically conductive layer to enhance inductive coupling. In some scenarios, the magnetically conductive layer 212 may be composed of a ferrite material to partially couple to a magnetic field presented at either the first receiving coil 202 or the second receiving coil 204.

In some scenarios, the first receiving coil 202 and the second receiving coil 204 may be disposed at a distance 214 from each other. For example, the distance 214 may be 10 percent of the height of the vertical coil. The distance 214 may provide space to fold the magnetically conductive layer 212 between the two coils 202, 204.

Figure 3A:
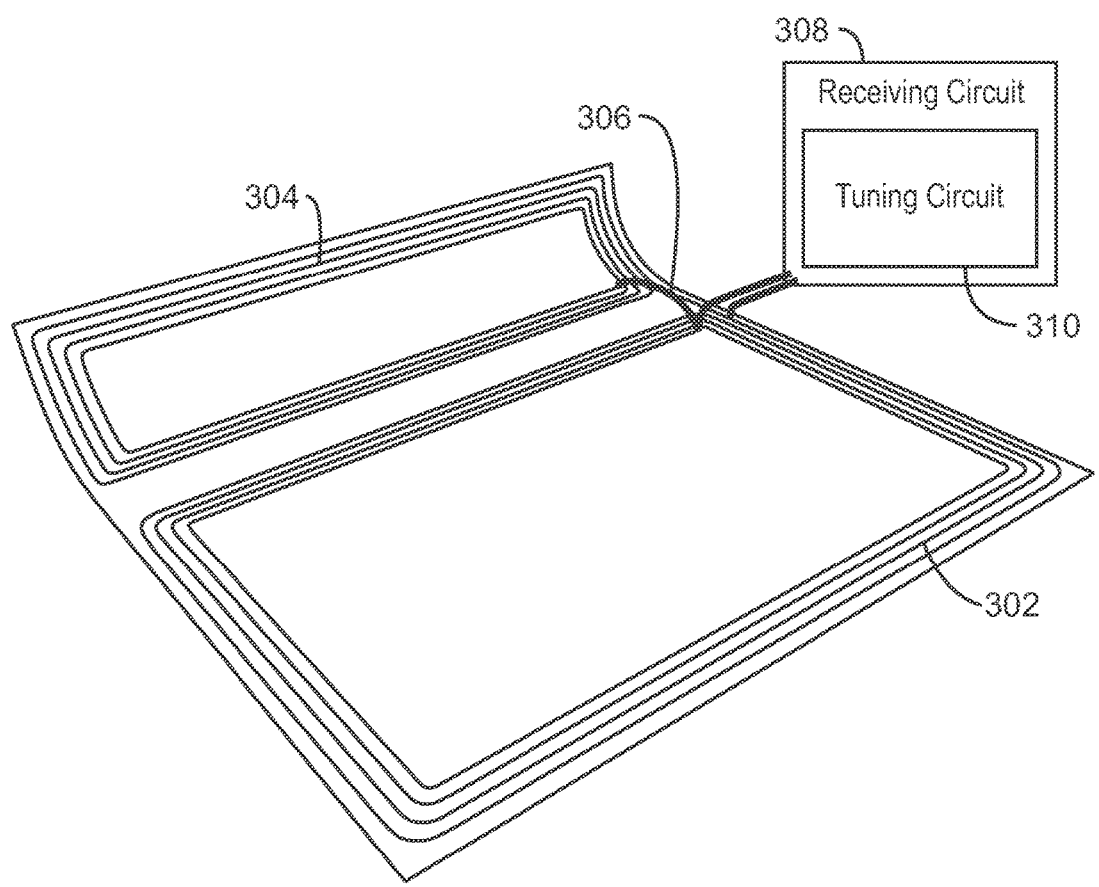
FIG. 3A is another example illustration of a wireless power receiving unit that may be used in a device to be charged.

FIG. 3A is another example illustration of a wireless power receiving unit that may be used in a device to be charged. Similar to the wireless power receiving unit 200 of FIG. 2, the wireless power receiving unit 300 includes a first receiving coil 302 and a second receiving coil 304, connected as indicated at 306. Both receiving coils, 302 and 304, are connected to a receiving circuit 308. In some aspects, a parallel connection 306 of the first receiving coil 202 and the second receiving coil 204 may reduce the resistance of the wireless power receiving unit. As discussed above, the parallel connection 306 may enable a single tuning circuit 310 to be used by both the first receiving coil 302 and the second receiving coil 304.

In aspects, the second receiving coil 304 is not straight. As illustrated in FIG. 3, the second receiving coil 304 is curved. In this aspect, the second receiving coil 304 may be formed on a flexible printed circuit board such that a profile of the second receiving coil 304 is curved, or at least not straight. In this aspect, the second receiving coil 304 may fit a smartphone design having a curved side, for example. Alternative shapes of the second receiving coil 304 are contemplated by the present disclosure.

Figure 3B:
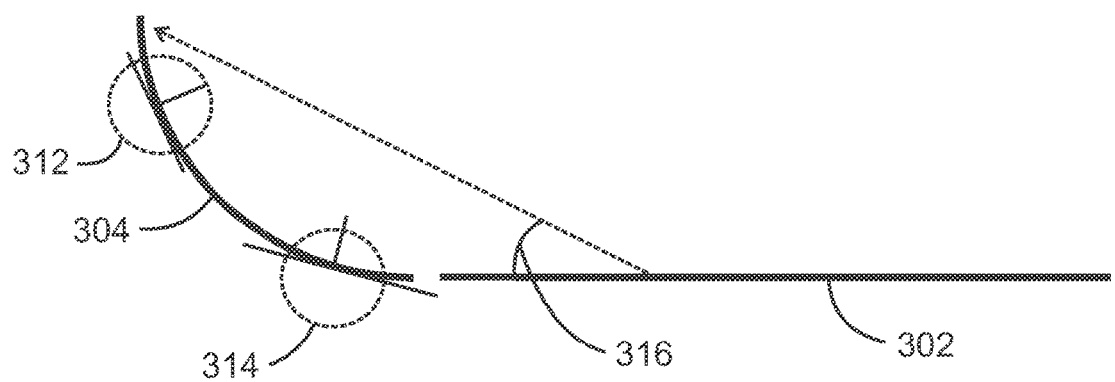
FIG. 3B is a side profile view of a wireless power receiving unit that may be used in a device to be charged.

FIG. 3B is a side profile view of a wireless power receiving unit that may be used in a device to be charged. As illustrated in FIG. 3B, the profile of the second receiving coil 304 is curved. The curvature may be defined by the difference between slopes of lines tangential to various different points of the curved profile, indicated by the dashed circles 312 and 413. The second receiving coil 304 may be disposed at an angle 316 to the first receiving coil. In some aspects, the angle 316 ranges from an angle greater than 0 degrees and equal to or less than 45 degrees.

Figure 3C:
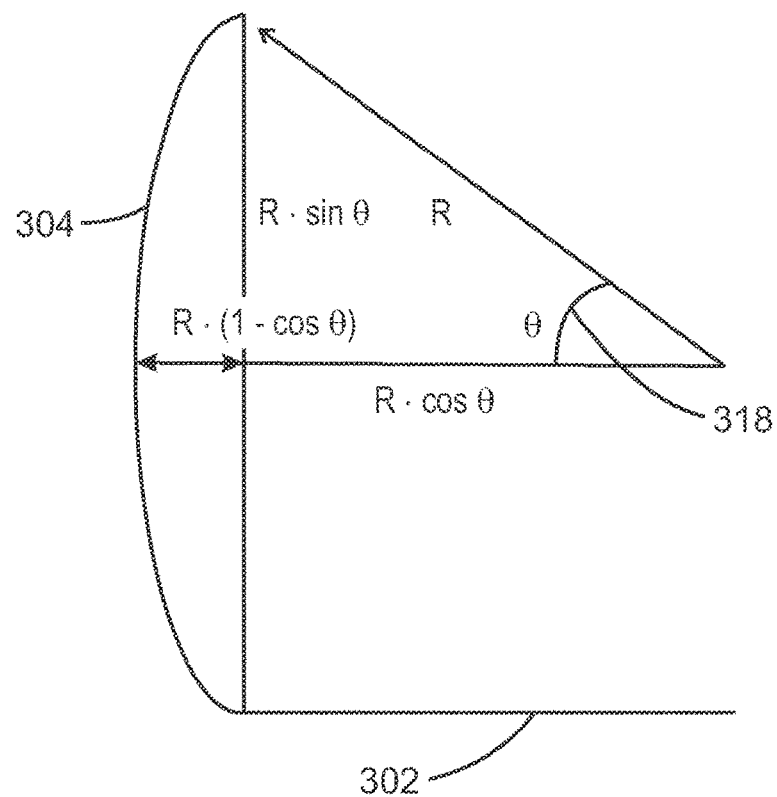
FIG. 3C is a side profile view of a wireless power receiving unit that may be used in a device to be charged.

FIG. 3C is a side profile view of a wireless power receiving unit that may be used in a device to be charged. In some aspects, the curvature of the second receiving coil 304 may be defined as an edge curvature EC. EC may depend on a relationship of dimensions of the wireless power receiving unit, and/or a device, such as a smartphone that may house the wireless power receiving unit, as indicated in Equation 2 below:

$$EC = R(1 - \cos \theta) \qquad \text{Eq. 2}$$

In Eq. 2, EC is equal to 1 minus the cosine of an angle 318, multiplied by a radius (R), indicated at 320 in FIG. 3C. In some scenarios, the larger the EC, the less magnetic flux can be coupled to the second receiving coil 304. In some aspects, to couple at least 50% of a magnetic field, the angle 318 may have a range as indicated in Eq. 3 below:

$$0 < \theta < \pi/4 \qquad \text{Eq. 3}$$

Figure 4:
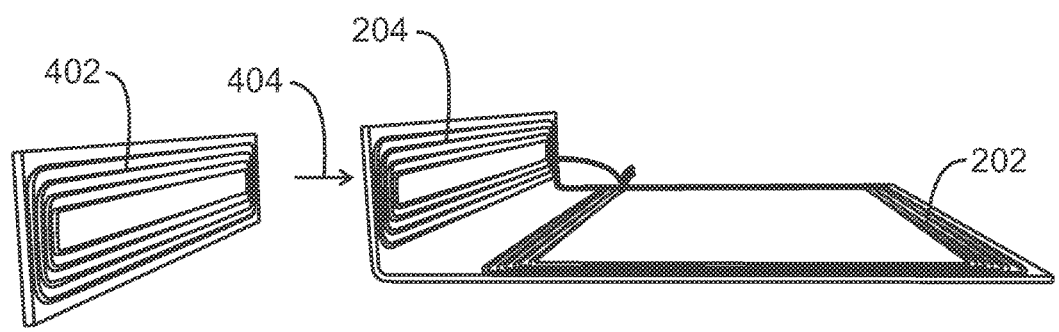
FIG. 4 is a diagram illustrating a transmitting coil coupling to a second receiving coil.

FIG. 4 is a diagram illustrating a transmitting coil coupling to a second receiving coil. The wireless power receiving unit illustrated in FIG. 4 may be the wireless power receiving unit 200 discussed above in regard to FIG. 2. However, alternative aspects wherein the wireless power receiving unit 300 discussed above in regard to FIG. 3 may also be used. In either aspect, a vertically disposed transmitting coil 402 may couple to the second receiving coil 204, as indicated by the arrow 404. In this aspect, vertically disposed transmitting and receiving pairs, such as the transmitting coil 402 and the second receiving coil 204, may be used alone or in addition to horizontal transmitting and receiving coils, such as the first receiving coil 202 and a charging pad, such as the charging device 104 discussed above in reference to FIG. 1, and as discussed in more detail below.

Figure 5:
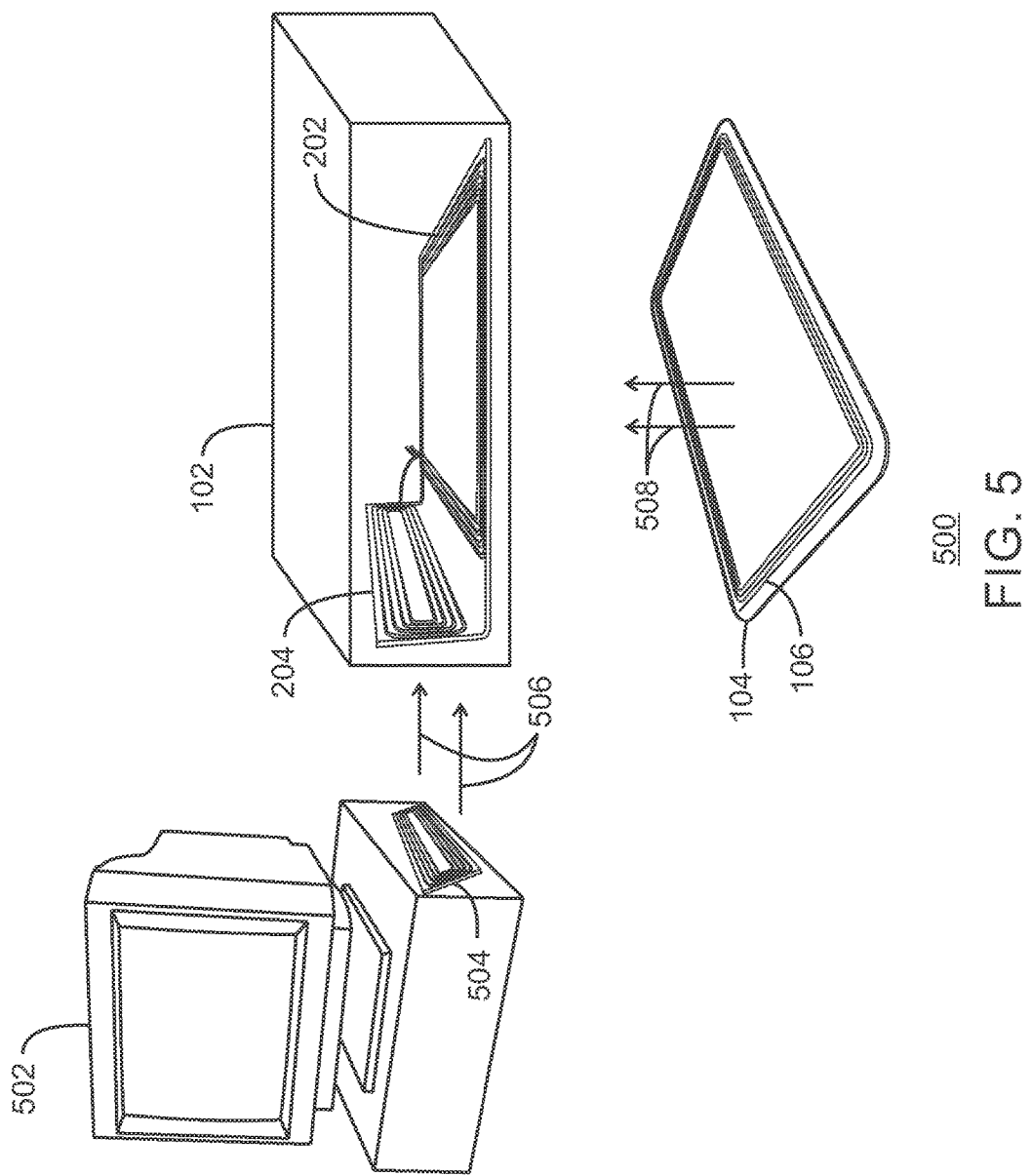
FIG. 5 is a diagram illustrating a device having wireless power receiving unit to receive charge at a first and a second receiver coil.

FIG. 5 is a diagram illustrating a device having wireless power receiving unit to receive charge at a first and a second receiver coil. The diagram 500 includes a computing device 502 having a transmitting coil 504 configured to couple with the second receiving coil 204 of a device to be charged, such as the device 102, discussed above in reference to FIG. 1. As indicated by the arrows 506, the magnetic field generated by the transmitting coil 504 is coupled to the receiving coil 204. Alternatively or additionally, as indicated by the arrows 508, the magnetic field generated by the transmitting coil 106 is coupled to the receiving coil 202, as discussed above in reference to FIG. 1. The aspects described herein enable a user at least two surface options when charging a device. For example, in FIG. 1, a device 102 is charged from a charging pad, while in FIG. 5, the device is charged from a computing device 502 adjacent to the device to be charged 102.

Figure 6:
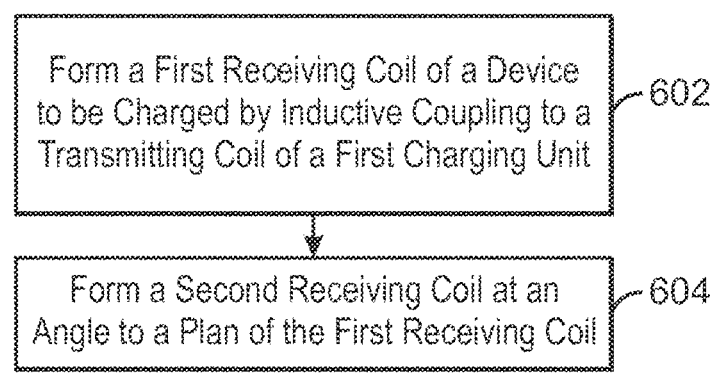
FIG. 6 is a block diagram illustrating a method for forming a power receiving unit having a first and second receiver coil.

FIG. 6 is a block diagram illustrating a method for forming a power receiving unit having a first and second receiver coil. At block 602, a first receiving coil may be formed. The first receiving coil may be disposed in a device to be charged by inductive coupling to a first transmitting coil. At block 604, a second receiving coil is formed. The second receiving coil is to be charged by inductive coupling to a second transmitting coil. In aspects, the first and second transmitting coils are disposed in different devices. In some aspects the first and second transmitting coils are disposed in an integrated device. In either aspect, the second receiving coil is disposed at angle relative to a plane of the first receiving coil, and the first and second receiving coil are formed to be connected in parallel to a receiving circuit, such that overall resistance of the wireless power receiving unit is reduced.

For example, the second receiving coil may be formed perpendicular to the plane of the first receiving coil. In another example, the second receiving coil may be formed having a curved profile such that the angle between the second receiving coil and the plane of the first receiving coil comprises a plurality of angles. Other forms of the second receiver coil are contemplated, such as receiver coils comprising multiple turns and curves, or otherwise having profiles that are not straight. In some aspects, the second receiver coil may be formed on a flexible printed circuit board enabling a profile of the second receiver coil to be curved or otherwise not straight.

The method of forming a wireless power receiving unit, as discussed above, may enable any combination of wireless charging being received at the first and second receiving coils. For example, the formation of the first and second receiving coils may be such that a charge may be received at the second receiving coil when aligned next to a transmitting coil in a laptop. As another example, the first and second receiving coil may receive charge from a charging pad as well as from a laptop, respectively.

Example 1

A device to receive charge is described herein. The device may include a first receiving means, such as a receiver coil. The first receiving means is configured to be charged by inductive coupling to a first transmitting means. The first transmitting means may be a transmitting coil of another device, such as a charge pad. The device may include a second receiving means to be charged by inductive coupling to a second transmitting means. For example, the second receiving means may be a receiver coil of the device, and the second transmitting means may be a transmitting coil of yet another device, such as a computer, or laptop. The second receiving means is to be disposed at an angle to a plane of the first receiving means. A receiving circuit of the device is to be connected in parallel to the first receiving means and the second receiving means.

Example 2

A wireless power receiving means is disclosed herein, including a first receiving coil and a second receiving coil. The first receiving coil is to be charged by inductive coupling to a first transmitting coil, while the second receiving coil may be inductively coupled to a second transmitting coil. The first and second transmitting coil may be coils of separate devices. In aspects, the second receiving coil is disposed at an angle to the first receiving coil. In this scenario, the wireless power receiving means may be coupled to a transmitting coil of a charging pad as well as a charging coil of a laptop computer disposed adjacent to a device having the wireless power receiving means.

Example 3

A method of forming wireless power receiving means is disclosed herein, including forming a first receiving coil and a second receiving coil. The first receiving coil is to be charged by inductive coupling to a first transmitting coil, while the second receiving coil may be inductively coupled to a second transmitting coil. The first and second transmitting coil may be coils of separate devices. In aspects, the second receiving coil is disposed at an angle to the first receiving coil. In this scenario, the wireless power receiving means may be coupled to a transmitting coil of a charging pad as well as a charging coil of a laptop computer disposed adjacent to a device having the wireless power receiving means.

An aspect is an implementation or example. Reference in the specification to "an aspect," "one aspect," "some aspects," "various aspects," or "other aspects" means that a particular feature, structure, or characteristic described in connection with the aspects is included in at least some aspects, but not necessarily all aspects, of the present techniques. The various appearances of "an aspect," "one aspect," or "some aspects" are not necessarily all referring to the same aspects.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method of forming a wireless power receiving unit, comprising:
    forming a first receiving coil to be charged by inductive coupling to a first transmitting coil; and
    forming a second receiving coil to be charged by inductive coupling to a second transmitting coil; the second receiving coil being disposed at an angle to a plane of the first receiving coil, the first receiving coil and the second receiving coil to couple in parallel to a receiving circuit;
    wherein the first receiving coil is disposed on a bottom of a device such that the plane of the first receiving coil is parallel to the bottom of the device, and the second receiving coil is disposed on a side of the device perpendicular to the bottom.

2. The method of claim 1, wherein the second receiving coil is disposed at an angle perpendicular to the plane of the first receiving coil.

3. The method of claim 1, wherein forming the second receiving coil comprises forming a receiving coil on a flexible printed circuit board.

4. The method of claim 1, wherein a profile of the second receiving coil comprises a curvature defined by a difference between slopes of tangential lines at different points of the curved profile.

5. The method of claim 1, wherein a profile of the second receiving coil is at an angle ranging from more than about 0 degrees and up to and including about 45 degrees to the first receiving coil.

6. The method of claim 1, wherein the first receiving coil and the second receiving coil are connected in parallel to a single tuning circuit.

7. The method of claim 1, wherein the first receiving coil and the second receiving coil are formed to receive a charge at the device at the first receiving coil, the second receiving coil, or any combination of the first and second receiving coil.

8. The method of claim 1, further comprising determining a number of turns of the second receiving coil based on factors comprising:
    a number of turns of the first receiving coil;
    an area or diameter of the first receiving coil; and
    an area or diameter of the second receiving coil.

9. The method of claim 8, wherein the second receiving coil comprises less turns than the first receiving coil.

10. The method of claim 1, comprising forming a magnetically conductive layer at a surface of the first receiving coil and a surface of the second receiving coil.

11. A wireless power receiving unit, comprising:
    a first receiving coil configured to receive charge by inductive coupling to a first transmitting coil; and
    a second receiving coil configured to receive charge by inductive coupling to a second transmitting coil; the second receiving coil being disposed at an angle to a plane of the first receiving coil, the first receiving coil and the second receiving coil to connect in parallel to a receiving circuit;
    wherein the first receiving coil is disposed on a bottom of a device such that the plane of the first receiving coil is parallel to the bottom of the device, and the second receiving coil is disposed on a side of the device perpendicular to the bottom.

12. The wireless power receiving unit of claim 11, wherein the second receiving coil is disposed at an angle perpendicular to the plane of the first receiving coil.

13. The wireless power receiving unit of claim 11, wherein a profile of the second receiving coil is curved, a curvature of the curve being based on a difference between slopes of tangential lines at different points of the curved profile.

14. The wireless power receiving unit of claim 11, wherein a profile of the second receiving coil is at an angle ranging from more than about 0 degrees and up to and including about 45 degrees.

15. The wireless power receiving unit of claim 11, further comprising a single tuning circuit, wherein the first receiving coil and the second receiving coil are connected in parallel to the single tuning circuit.

16. The wireless power receiving unit of claim 11, the second receiving coil comprising a number of turns, wherein the number of turns is based on factors comprising:
    a number of turns of the first receiving coil;
    an area or diameter of the first receiving coil; and
    an area or diameter of the second receiving coil.

17. The wireless power receiving unit of claim 16, the second receiving coil comprising less turns than the first receiving coil.

18. The wireless power receiving unit of claim 11, comprising a magnetically conductive layer at a surface of the first receiving coil and a surface of the second receiving coil.

19. A device to receive a charge, comprising:
    a first receiving coil configured to receive charge by inductive coupling to a first transmitting coil;
    a second receiving coil configured to receive charge by inductive coupling to a second transmitting coil; the second receiving coil being disposed at an angle to a plane of the first receiving coil; and
    a receiving circuit connected in parallel to the first receiving coil and the second receiving coil;
    wherein the first receiving coil is disposed on a bottom of a device such that the plane of the first receiving coil is parallel to the bottom of the device, and the second receiving coil is disposed on a side of the device perpendicular to the bottom.

20. The device of claim 19, wherein the second receiving coil is disposed perpendicular to the first receiving coil.

21. The device of claim 19, further comprising a single tuning circuit, wherein the first receiving coil and the second receiving coil are connected in parallel to the single tuning circuit.

22. The device of claim 19, wherein a profile of the second receiving coil comprises a curvature defined by a difference between slopes of tangential lines at different points of the curved profile.

23. The device of claim 19, the second receiving coil comprising less turns than the first receiving coil.

24. The device of claim 19, the second receiving coil comprising turns, the number of turns being based on factors comprising:
    a number of turns of the first receiving coil;
    an area or diameter of the first receiving coil; and
    an area or diameter of the second receiving coil.

* * * * *